United States Patent
Dake et al.

(10) Patent No.: US 9,952,959 B2
(45) Date of Patent: Apr. 24, 2018

(54) VARIADIC ARGUMENT SERIALIZATION OF PROCESS EVENTS

(75) Inventors: Steven C. Dake, Scottsdale, AZ (US); Angus Salkeld, Eaglemont (AU)

(73) Assignee: Red Hat, Inc., Raleigh, NC (US)

( * ) Notice: Subject to any disclaimer, the term of this patent is extended or adjusted under 35 U.S.C. 154(b) by 141 days.

(21) Appl. No.: 13/482,874

(22) Filed: May 29, 2012

(65) Prior Publication Data

US 2013/0325905 A1    Dec. 5, 2013

(51) Int. Cl.
*G06F 11/34*    (2006.01)

(52) U.S. Cl.
CPC .............................. *G06F 11/3476* (2013.01)

(58) Field of Classification Search
CPC .............................. G06F 11/30; G06F 11/3476
See application file for complete search history.

(56) References Cited

U.S. PATENT DOCUMENTS

| | | | | |
|---|---|---|---|---|
| 6,021,408 | A | * | 2/2000 | Ledain et al. ................. 707/823 |
| 7,363,539 | B1 | * | 4/2008 | Mitrov .................. G06F 11/203 709/227 |
| 7,698,659 | B1 | * | 4/2010 | Rainwater ............. G06F 17/227 715/853 |
| 2004/0167912 | A1 | * | 8/2004 | Tsui et al. ...................... 707/100 |
| 2004/0215603 | A1 | * | 10/2004 | Sonkin et al. .................... 707/3 |
| 2006/0020634 | A1 | * | 1/2006 | Huras et al. ................... 707/200 |
| 2006/0047684 | A1 | * | 3/2006 | Cherkauer ........ G06F 17/30368 |
| 2006/0179058 | A1 | * | 8/2006 | Bram et al. ........................ 707/9 |
| 2009/0282391 | A1 | * | 11/2009 | Gutierrez et al. ............ 717/128 |
| 2010/0161668 | A1 | * | 6/2010 | Strenge ............. G06F 17/30569 707/791 |

* cited by examiner

*Primary Examiner* — Alex Gofman
(74) *Attorney, Agent, or Firm* — Lowenstein Sandler LLP (57) ABSTRACT

A logging tool running on a computing device serializes system and application events. The logging tool analyzes a logging stream from a process to identify if the logging stream includes a formatting instruction. The logging tool identifies at least one argument associated with the formatting instruction, and serializes the formatting instruction and the at least one argument by recording, to a buffer, the formatting instruction and the at least one argument without formatting the logging stream.

14 Claims, 5 Drawing Sheets

VARIADIC ARGUMENT SERIALIZATION OF PROCESS EVENTS

TECHNICAL FIELD

This disclosure relates to the field of computing, and in particular, to the logging of system messages.

BACKGROUND

Current event loggers, applications operating on an operating system, record events that occur in operating system applications. Typically, event loggers receive, from other applications, a string of data elements and corresponding formatting instructions. The event loggers convert the data elements and formatting instructions to a string that can be recorded in a buffer that is later saved on an application or process crash. By recording the logging buffer in memory, the performance of the system is vastly improved compared to recording the buffer on a disk.

One customary method for recording events is to call a conventional print function from within the process or application, for example, in the C programming language, the printf( ) function. However, such print functions are relatively inefficient due to parsing the string of data elements and the corresponding formatting instructions, and formatting the data elements. Up to 15% CPU utilization may occur when format instructions and related parameters are converted into a formatted string. Furthermore, in most cases this formatted string is never reviewed, unless there is a system or application crash.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Described herein are methods and systems serializing logging streams. Embodiments of the present disclosure provide a logging tool configured to analyze a logging stream from a process to identify a formatting instruction, identify at least one argument associated with the formatting instruction, and serialize the formatting instruction and the at least one argument by recording, directly to a buffer, the formatting instruction and the at least one argument without formatting the logging stream.

The logging tool iteratively identifies the plurality of formatting instructions in the logging stream and serializes each of the formatting instructions with at least one associated data argument by recording, directly to the buffer, the formatting instructions with the associated argument.

In one embodiment, the logging tool identifies a crash event and copies the formatting instruction and the argument from the buffer to persistent storage. Upon request, the logging tool also deserializes the formatting instruction and the at least one argument.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "identifying", "parsing", "recording", "retrieving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
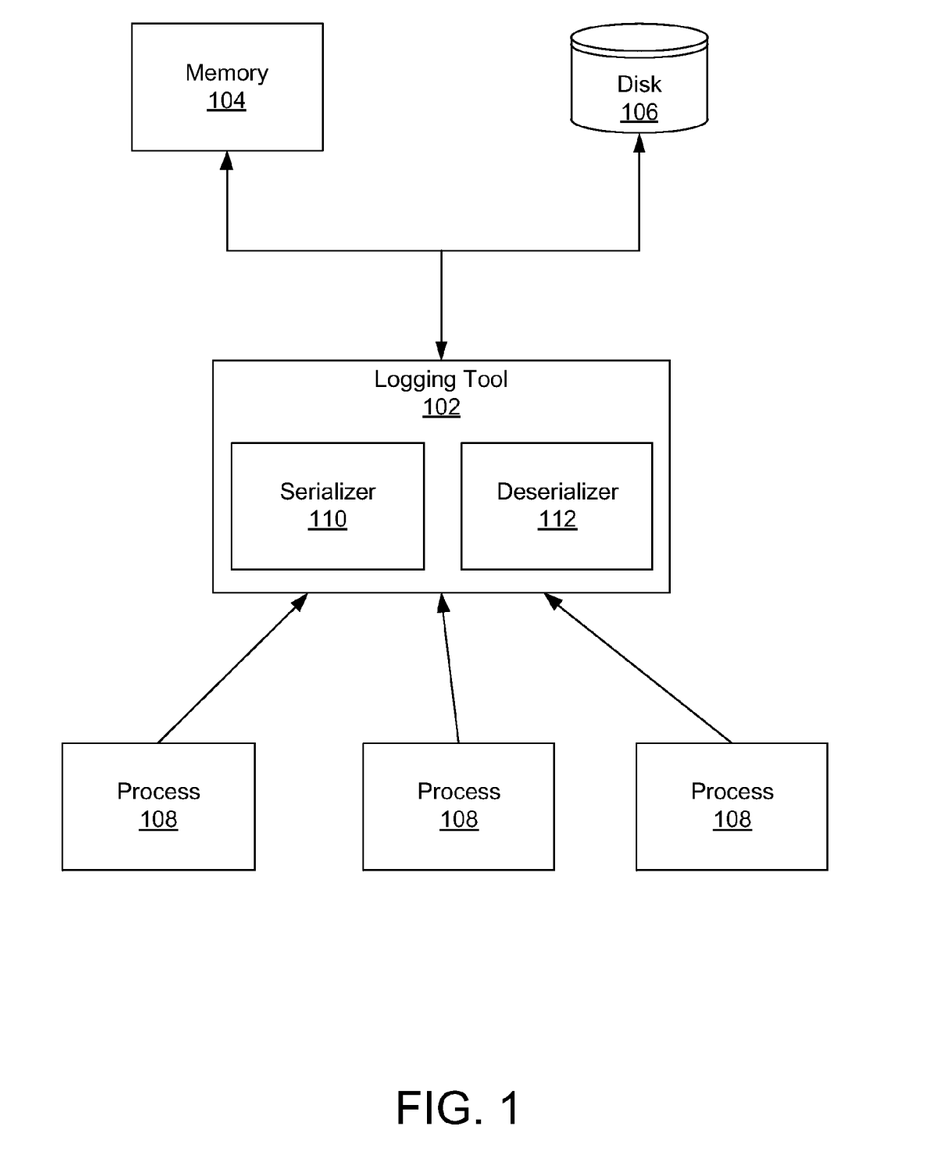
FIG. 1 is a schematic block diagram illustrating one embodiment of a system for serialization a logging stream.

FIG. 1 is a schematic block diagram illustrating one embodiment of a system 100 for serialization of variadic arguments. The system 100 includes a logging tool 102, a memory 104, and a disk 106. The system 100, in one embodiment, is configured to operate within an operating system that manages the resources of processes 108, and the resources of the computing system upon which the operating system resides. The processes 108 may include, but are not limited to, any program or executable code, such as driver programs, utility programs, and system programs. Stated differently, the process 108 as depicted is representative of any program or process that may log system or application events.

The logging tool 102 is configured to receive logging streams (e.g., streams of data events from different applications to be recorded to a system log) from processes 108. The logging tool 102 may be configured to monitor computer system management events, security auditing events, or informational events. Logging is especially important in debugging an application or process 108 that is crashing (is terminating abnormally) and the reason why the application or process 108 is crashing is not readily apparent. The logging tool 102 records details from the processes 108 regarding, for example, system state, application state, values of variables, return values of functions and algorithms, etc.

Understandably, a large amount of data is generated and recorded. To increase performance of a computing system, such as the computing system 500 of FIG. 5, the logging tool 102 may record logging events in RAM, or volatile, memory 104. As logged events are most useful for analyzing a process crash, the logging tool 102 may record events to the memory 104 until a process crash occurs at which point the logging buffer maintained in the memory 104 may be written to the disk 106 (or other persistent storage). The logging buffer, in one example, is implemented as a ring buffer whereby relevant data to be logged is written to the memory 104 in a circular fashion. As the circular buffer fills with logged events, new data may overwrite the oldest data in the memory 104.

The processes 108 communicate events with the logging tool 102 for recording to the memory 104. The events, in one embodiment, are communicated in a standard logging format that includes a format string (formatting instructions) and one or more data arguments. In a conventional system 100, a process 108 makes a call to a print formatted (printf) function. The printf function receives the formatting instructions and one or more data arguments and renders a formatted or human-readable string. Characters in the format string are typically copied into the rendered output according to the formatting instructions. The formatting instructions or flags, in many programming languages, are introduced by the "%" character. Examples of formatting instructions (also known as flags, characters, etc.) include, but are not limited to:

| Type | Description | Example |
|------|-------------|---------|
| c | Character | a |
| e | Sci Notation | 1.42e34 |
| E | Sci Notation | 1.42E34 |
| f | Dec. Float | 193.53 |
| o | Signed Octal | 610 |
| d or i | Integer | 32 |
| s | String | rocks |
| u | unsigned Dec | 43525 |
| p | Address point | A340:0000 |
| x | Hexadecimal | 3fa |
| X | Hexadecimal | 3FA |
| n | Nothing | |

For example, a call to the printf function of printf("Color % s,Number % d,Float %5.2f", "red", 123456, 3.14159;) (Ex. 1)

results in the output:
Color red, Number 123456, Float 3.14.

The above is an example of the formatting instructions (Color % s, Number % d, Float %5.2f) that describe how the data arguments (red, 123456, 3.14159) are to be displayed. Typically, characters inside the formatting instructions that are not preceded by the formatting character '%' are written without any conversion to the output. Otherwise, the formatting character '%' will be followed by one or more characters that identify the formatting for a corresponding argument. However, formatting the instructions and arguments into a human-readable string may require up to ~15% of CPU utilization. Furthermore, the majority of recorded events are never reviewed by a user, unless a process (application) 108 crashes.

The serializer 110 overcomes the above described formatting penalty by recording the formatting instructions and arguments directly to the memory 104 by serializing the variadic parameters passed to the logging tool 102. The serializer 110, in one embodiment, receives as input a call to a formatted print function that may include a formatting instruction corresponding to an argument. In a further embodiment, the serializer 110 receives a call to a formatted print function that includes multiple formatting instructions grouped together and multiple data arguments grouped together as described above with reference to Example 1.

The serializer 110, upon receiving a record event request, parses the formatting string and the data arguments to serialize the input. The serializer 110 is configured to parse the formatting string and the data argument string, bit by bit, and generate a serialized buffer. Using Example 1, the serializer 110 is configured to analyze the formatting string "Color % s, Number % d, Float %5.2f" and identify the formatting characters. In this example, the serializer 110 first identifies the "% s." Depending upon the programming language used, % s may be indicative of different formatting instructions. For example, % s may be indicative of a string that corresponds to the string "red." If the formatting instruction does not identify the length of the data argument, then the serializer 110 determines the length of the data argument and records the formatting instruction, the argument length, and the corresponding data argument to the memory 104. Stated differently, the serializer 110 is configured to analyze the format string and the data arguments, and generate a serialized buffer.

The deserializer 112 is configured to convert the serialized log output of the serializer 110 into a human-readable format. In one embodiment, the deserializer parses the serialized log output and formats the arguments according to the formatting instructions and the corresponding data arguments. In a manner similar to the serializer 110, the deserializer 112 parses the serialized log output to identify formatting characters and corresponding data arguments, and formats the data arguments according to the formatting instructions. In one example, the deserializer 112 parses the serialized log output and generates a sprintf function call for each identified formatting instruction and data argument. Alternatively, the deserializer 112 generates a buffer of formatting arguments and data arguments that are then provided to the sprintf function. Although sprintf is given by way of example here, it should be noted that the deserializer 112 may be configured to parse the serialized log output and generate a buffer in a format usable by any of the print formatted functions.

The present disclosure is described hereinafter with reference to flowchart and/or block diagram illustrations of methods, systems, and computer program products according to an embodiment of the disclosure. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the flowchart and/or block diagram block or blocks.

Figure 2:
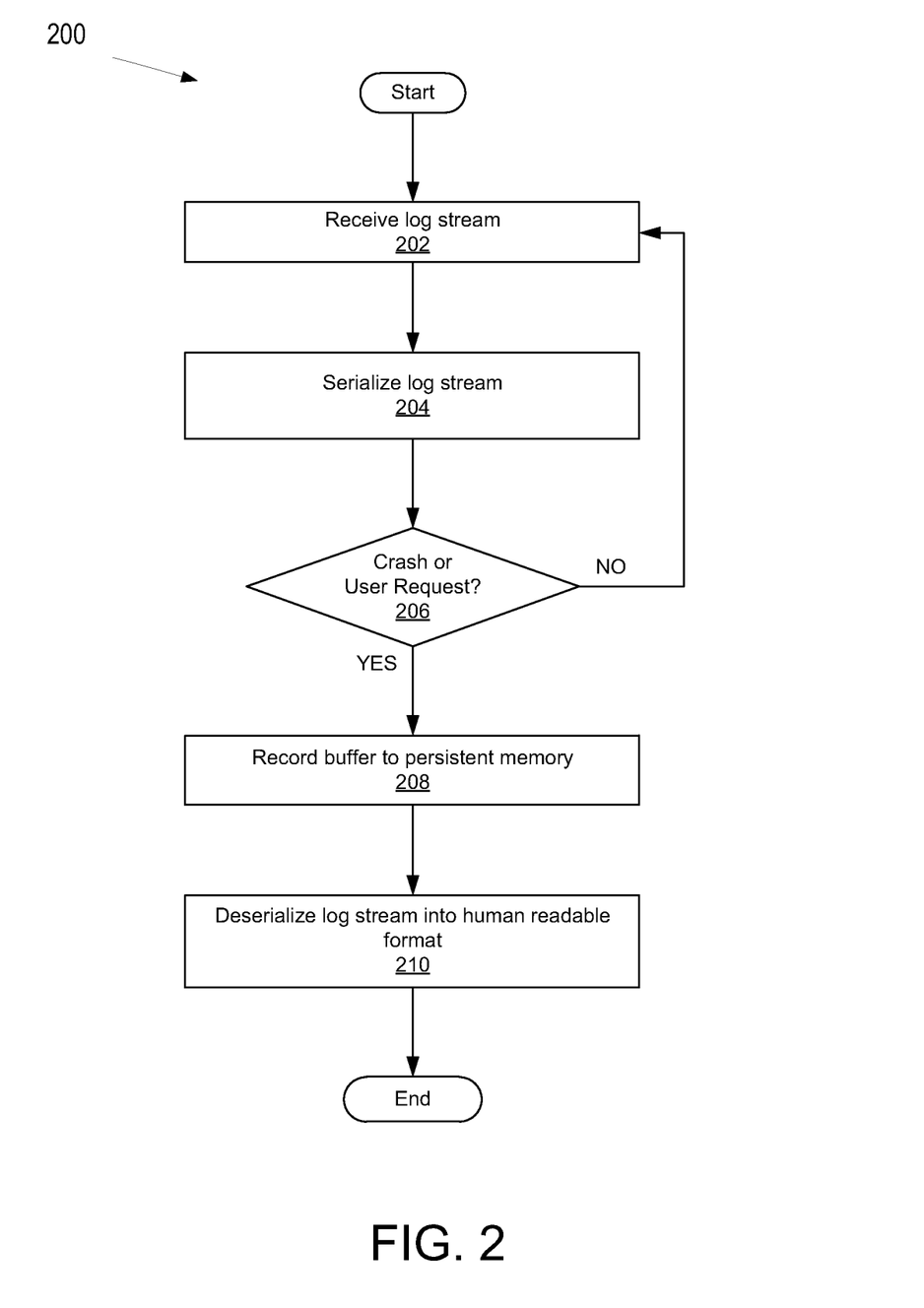
FIG. 2 is a flowchart diagram of an embodiment for a method of variadic argument serialization.
Figure 5:
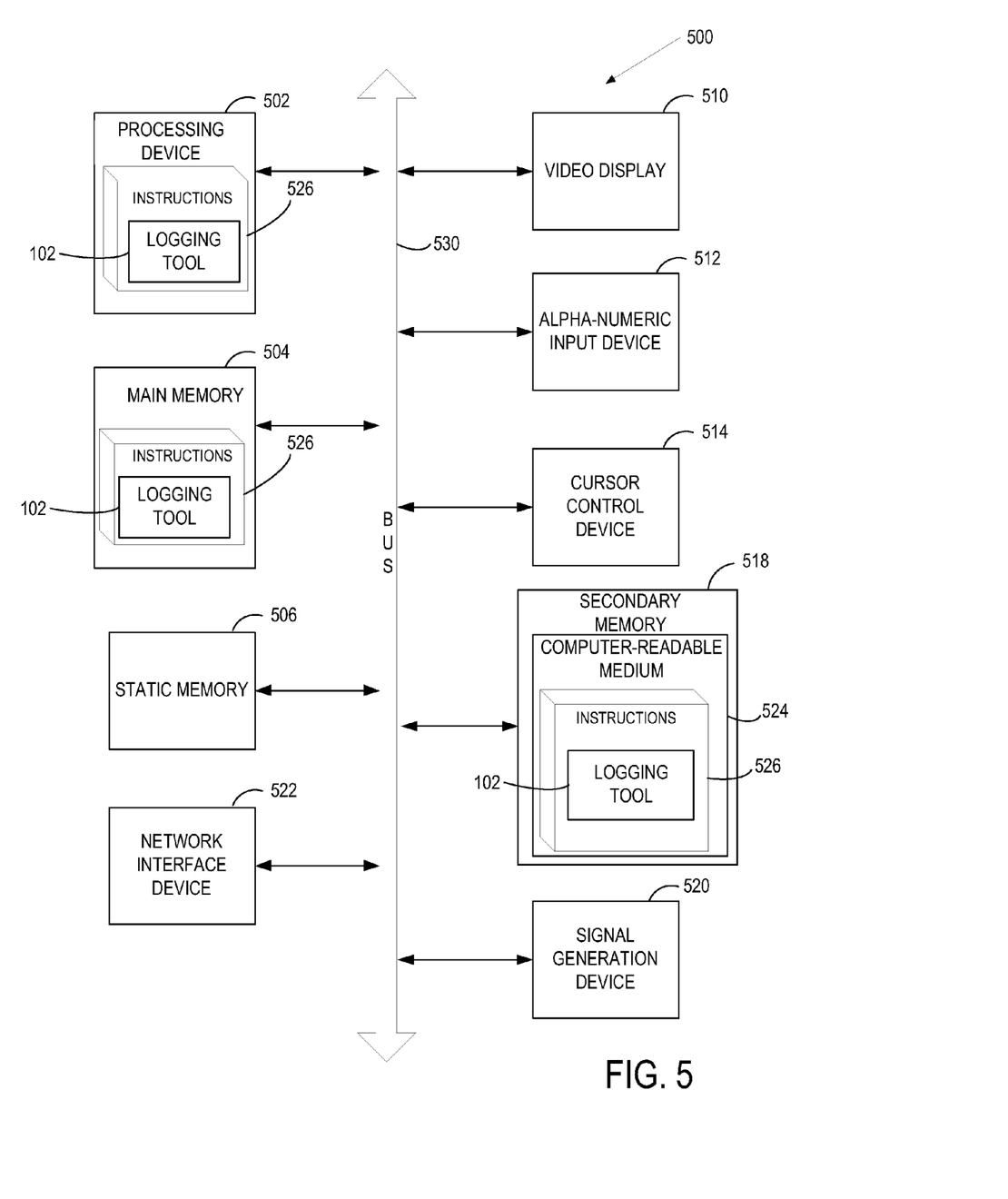
FIG. 5 is a diagram of one embodiment of a computer system for facilitating the execution logging stream serialization.

FIG. 2 is a flow diagram of an embodiment for a method 200 of variadic argument serialization. The method 200 is performed by processing logic that may comprise hardware (circuitry, dedicated logic, etc.), software (such as is run on a general purpose computer system or a dedicated machine), or a combination of both. In one embodiment, the method is performed by a computer system 500 (e.g., by logging tool 102 that is part of the operating system of the computer system 500).

The method 200 starts with processing logic receiving a log stream at block 202. The log stream is formed with formatting instructions or characters and at least one data argument. The processing logic receives the log stream from a process. Examples of processes include, but are not limited to, an instance of a computer program that is being executed.

At block 204, processing logic serializes the log stream. Some embodiments of serializing the log stream will be discussed in greater detail hereinafter with reference to FIG. 3. At block 206, processing logic determines if a crash or other user request has occurred. If no crash or user request has occurred, processing logic returns to block 202 and continues to receive log streams. In one embodiment, processing logic records the serialized log stream in a circular buffer implemented in memory 104 of FIG. 1.

At block 208, if processing logic detects a crash or other user request, processing log records or copies the serialized log buffer to persistent or non-volatile memory, examples of which include, but are not limited to, hard disk drives, tape drives, etc. Processing logic, at block 210, then deserializes the serialized log stream into a human readable format. Some embodiments of deserializing a serialized log stream will be discussed in greater detail hereinafter with reference to FIG. 4.

Figure 3:
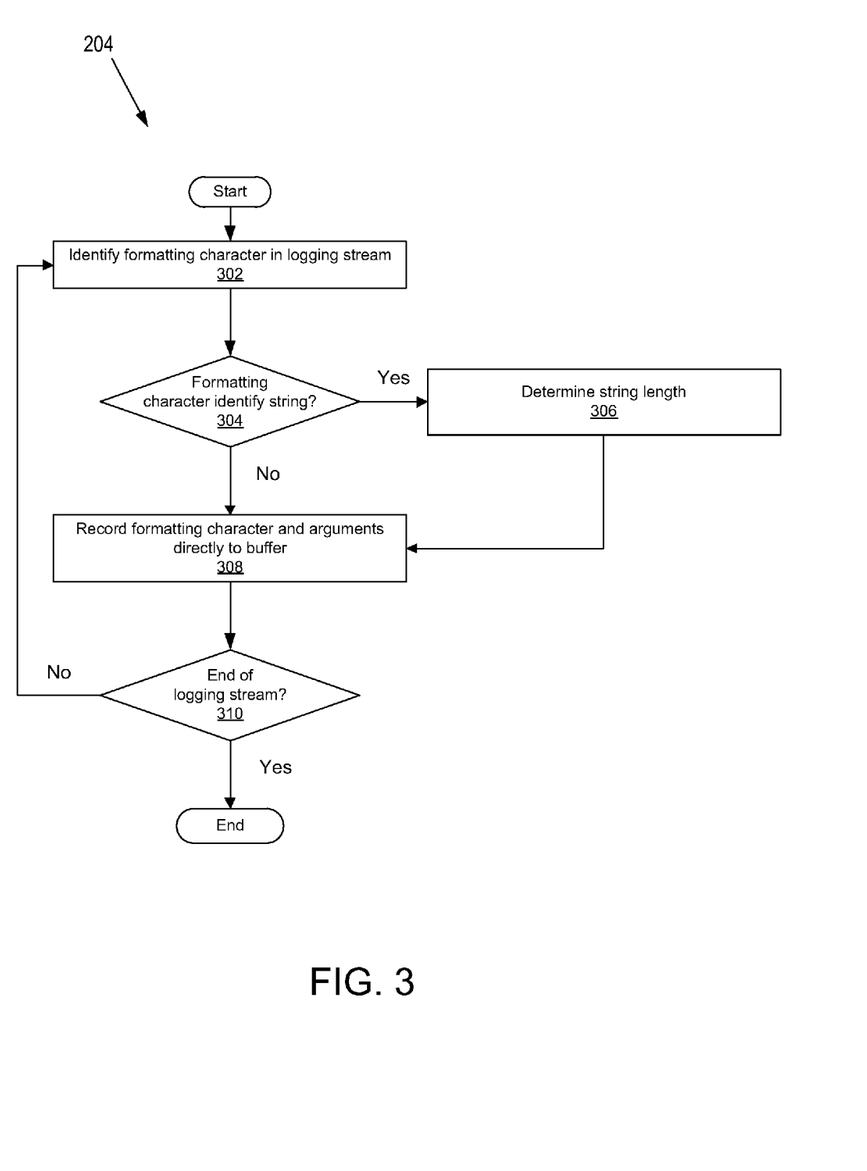
FIG. 3 is a flowchart diagram of an embodiment for a method of serializing a log stream.

FIG. 3 is a flow diagram of an embodiment for a method 204 of serializing a log stream. The method 204 starts at block 302 with processing logic identifying formatting instructions or character in the logging stream. For example, processing logic parses bit by bit the logging stream to identify a character indicative of a formatting instruction. Examples of such characters or instructions are known as escape characters. In one embodiment, the character indicative of a formatting instruction is the '%' character. One of skill in the art will recognize that the escape character is dependent upon the programming language or computing environment (e.g., operating system) in which the logging tool 102 resides.

If the processing logic, at block 304, detects a formatting character that identifies a string (i.e., % s), or other argument of unknown length, as opposed to a number having a length defined by the formatting character, the processing logic, at block 306, determines the string or other argument length of the associated data argument. For example, the processing logic may invoke the string length function.

Otherwise, the processing logic, at block 308 records the formatting character and associated data arguments directly to the buffer. The processing logic, at block 310, then determines if the end of the logging stream is reached, and if not, the processing logic returns to block 302 and resumes parsing the logging stream for formatting characters. If the processing logic determines the end of the logging stream is reached, the method 204 ends.

Figure 4:
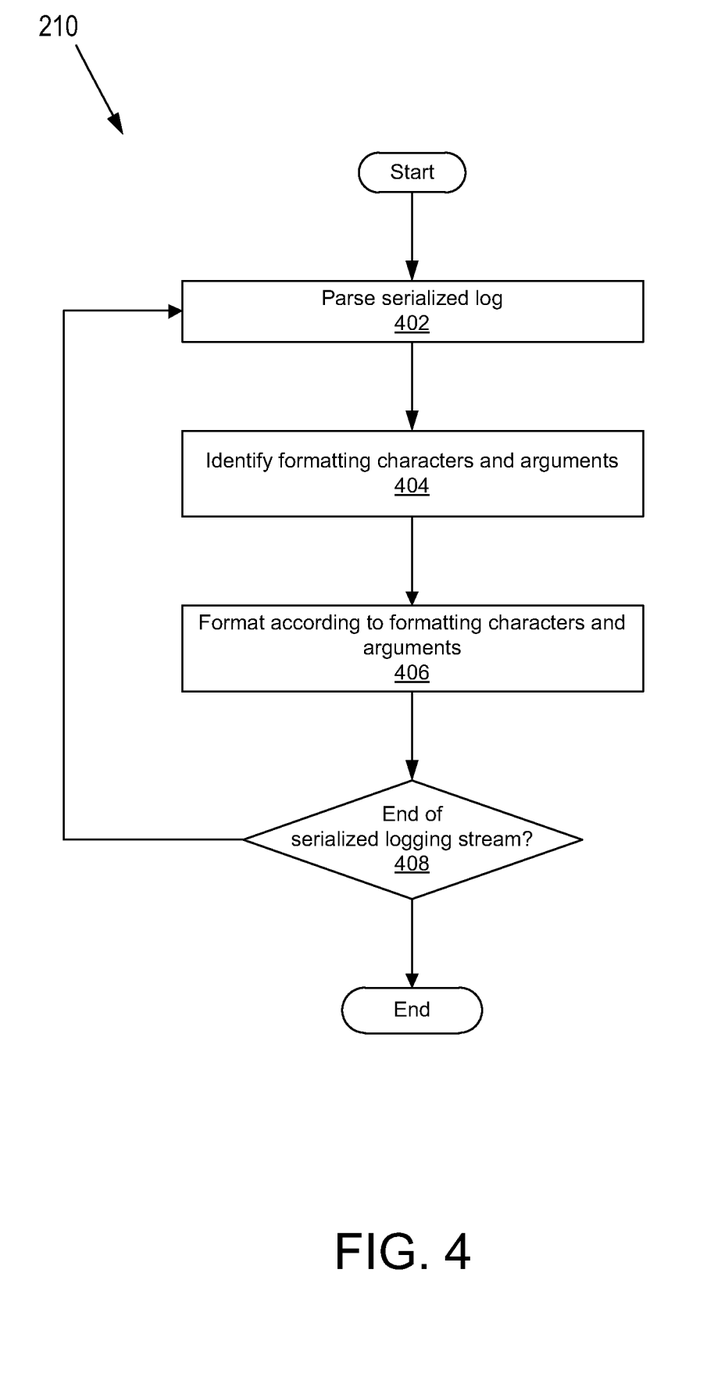
FIG. 4 is a flowchart diagram illustrating one embodiment of a method for deserializing a serialized log stream.

FIG. 4 is a flow diagram illustrating one embodiment of a method 210 for deserializing a serialized log stream. The method 210 starts with the processing logic, at block 402, parsing the serialized log. The processing logic, at block 404, analyzes the serialized log stream to identify formatting characters. In one embodiment, the formatting characters are identified with a leading '%' character. In other words, formatting characters, in one embodiment, begin with a "%." In other embodiments, and based on the programming language used, the formatting character may be any one of the keys on the keyboard.

The processing logic, at block 406, formats the data arguments according to the formatting characters. One example of formatting the data arguments according to the formatting instructions includes invoking a "sprintf" print formatted function. Alternatively, processing logic may invoke other print formatted functions, depending on the programming language. Examples in the C and C++ programming languages include printf, fprintf, snprintf, vprintf, etc. At block 408, processing logic determines if the end of the serialized logging stream has been reached, and if so, the method 210 ends. Alternatively, the processing logic returns to block 402 and continues to parse the serialized log.

FIG. 5 is a diagram of one embodiment of a computer system for facilitating the execution logging stream serialization. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the logging tool 102. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "serializing," "deserializing," "parsing," "identifying," "recording," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:
1. A method comprising:
   receiving a logging stream of a data event from a process being executed, wherein the logging stream of the data event is unformatted and comprises one or more formatting instructions and one or more arguments asso- ciated with the one or more formatting instructions to be recorded to a system log;

analyzing the logging stream of the data event to determine a formatting instruction of the one or more formatting instructions;

analyzing the logging stream of the data event to determine a first argument of the one or more arguments, wherein the first argument is associated with the formatting instruction;

serializing, by a processing device, the formatting instruction and the first argument into a sequence of bits;

recording the sequence of bits in a buffer without causing the logging stream of the data event to be formatted; and in response to identifying a crash event:
copying the sequence of bits associated with the formatting instruction and the first argument from the buffer to a persistent storage; and
deserializing the sequence of bits to restore the first argument by parsing the sequence of bits to identify the formatting instruction by identifying a character indicative of the formatting instruction and to identify the first argument and formatting the first argument into a formatted first argument according to the formatting instruction.

2. The method of claim 1, wherein the formatting instruction is a first formatting instruction of the one or more formatting instructions, and wherein the one or more formatting instructions comprise a plurality of formatting instructions.

3. The method of claim 2, further comprising iteratively identifying the plurality of formatting instructions in the logging stream.

4. The method of claim 3, further comprising:
serializing each of the plurality of formatting instructions with at least one associated argument of a plurality of arguments into a respective one of a plurality of sequences of bits;
recording, directly to the buffer, the plurality of sequences of bits.

5. The method of claim 1, further comprising causing to present, via a user interface, the formatted first argument.

6. A non-transitory computer readable storage medium comprising instructions that, when executed by a processing device, cause the processing device to:
receive a logging stream of a data event from a process being executed, wherein the logging stream of the data event is unformatted and comprises one or more formatting instructions and one or more arguments associated with the one or more formatting instructions to be recorded to a system log;
analyze the logging stream of the data event to determine a formatting instruction of the one or more formatting instructions;
analyze the logging stream of the data event to determine a first argument of the one or more arguments, wherein the first argument is associated with the formatting instruction;
serialize, by the processing device, the formatting instruction and the first argument into a sequence of bits;
record the sequence of bits in a buffer without causing the logging stream of the data event to be formatted; and
in response to identifying a crash event:
copy the sequence of bits associated with the formatting instruction and the first argument from the buffer to a persistent storage; and
deserialize the sequence of bits to restore the first argument by parsing the sequence of bits to identify the formatting instruction by identifying a character indicative of the formatting instruction and to identify the first argument and formatting the first argument into a formatted first argument according to the formatting instruction.

7. The non-transitory computer readable storage medium of claim 6, wherein the formatting instruction is a first formatting instruction of the one or more formatting instructions, and wherein the one or more formatting instructions comprise a plurality of formatting instructions.

8. The non-transitory computer readable storage medium of claim 6, wherein the processing device is further to iteratively identify the plurality of formatting instructions in the logging stream.

9. The non-transitory computer readable storage medium of claim 6, wherein the processing device is further to:
serialize each of the plurality of formatting instructions with at least one associated argument of a plurality of arguments into a respective one of a plurality of sequences of bits;
record directly to the buffer, the plurality of sequences of bits.

10. The non-transitory computer readable storage medium of claim 6, wherein the processing device is further to cause to present, via a user interface, the formatted first argument.

11. A computing apparatus comprising:
a memory; and
a processing device, operatively coupled to the memory, wherein the processing device is to:
receive a logging stream of a data event from a process being executed, wherein the logging stream of the data event is unformatted and comprises one or more formatting instructions and one or more arguments associated with the one or more formatting instructions to be recorded to a system log;
analyze the logging stream of the data event to determine a formatting instruction of the one or more formatting instructions;
analyze the logging stream of the data event to determine a first argument of the one or more arguments, wherein the first argument is associated with the formatting instruction;
serialize the formatting instruction and the first argument into a sequence of bits; and
record the sequence of bits in the memory without causing the logging stream of the data event to be formatted; and
in response to identifying a crash event:
copy the sequence of bits associated with the formatting instruction and the first argument from the buffer to a persistent storage; and
deserialize the sequence of bits to restore the first argument by parsing the sequence of bits to identify the formatting instruction by identifying a character indicative of the formatting instruction and to identify the first argument and formatting the first argument into a formatted first argument according to the formatting instruction.

12. The computing apparatus of claim 11, wherein the formatting instruction is a first formatting instruction of the one or more formatting instructions, and wherein the one or more formatting instructions comprise a plurality of formatting instructions.

13. The computing apparatus of claim 11, wherein the processing device is further to iteratively identify the plurality of formatting instructions in the logging stream.

14. The computing apparatus of claim 11, wherein the processing device is further to:
serialize each of the plurality of formatting instructions with at least one associated argument of a plurality of arguments into a respective one of a plurality of sequences of bits;
record directly to the memory the plurality of sequences of bits.

\* \* \* \* \*